US009303688B2

(12) United States Patent
Grosso

(10) Patent No.: US 9,303,688 B2
(45) Date of Patent: Apr. 5, 2016

(54) THERMAL BARRIER COATING FOR BEARING JOURNAL SURFACES OF ROTARY SHAFTS

(71) Applicant: Glenn R. Grosso, Olean, NY (US)

(72) Inventor: Glenn R. Grosso, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/315,674

(22) Filed: Jun. 26, 2014

(65) Prior Publication Data

US 2015/0043848 A1    Feb. 12, 2015

Related U.S. Application Data

(60) Provisional application No. 61/842,107, filed on Jul. 2, 2013.

(51) Int. Cl.
| | |
|---|---|
| *F16C 3/16* | (2006.01) |
| *F16C 33/10* | (2006.01) |
| *F16C 17/02* | (2006.01) |
| *F16C 33/02* | (2006.01) |
| *F16C 37/00* | (2006.01) |
| *F04D 29/04* | (2006.01) |
| *F04D 29/046* | (2006.01) |
| *F04D 17/12* | (2006.01) |
| *F04D 29/053* | (2006.01) |
| *F04D 29/057* | (2006.01) |
| *F04D 29/063* | (2006.01) |

(52) U.S. Cl.
CPC .......... *F16C 33/1065* (2013.01); *F04D 17/122* (2013.01); *F04D 29/04* (2013.01); *F04D 29/046* (2013.01); *F04D 29/053* (2013.01); *F04D 29/057* (2013.01); *F04D 29/063* (2013.01); *F16C 17/02* (2013.01); *F16C 33/02* (2013.01); *F16C 37/00* (2013.01)

(58) Field of Classification Search
CPC ............ F16C 3/02; F16C 17/02; F16C 33/02; F16C 33/102; F16C 33/1025; F16C 33/1045; F16C 33/1065; F16C 37/00; F16C 37/002; F04D 17/122; F04D 29/053; F04D 29/057; F04D 29/063
USPC .......................... 384/275–278, 280, 282, 317
See application file for complete search history.

(56) References Cited

U.S. PATENT DOCUMENTS

| | | | | |
|---|---|---|---|---|
| 2,648,573 | A  * | 8/1953 | Wheildon, Jr. ................... | 384/42 |
| 3,211,502 | A  * | 10/1965 | Lamson et al. ............... | 384/280 |
| 4,181,378 | A  * | 1/1980 | Schmaeng ..................... | 384/147 |
| 6,834,997 | B2 * | 12/2004 | Uesugi et al. ................. | 384/100 |
| 2006/0067814 | A1* | 3/2006 | Wang et al. ................ | 415/170.1 |
| 2008/0304776 | A1* | 12/2008 | Asada et al. ................... | 384/112 |
| 2009/0257702 | A1* | 10/2009 | Solfrank ....................... | 384/585 |

* cited by examiner

*Primary Examiner* — James Pilkington
(74) *Attorney, Agent, or Firm* — Edmonds & Nolte, PC

(57) ABSTRACT

A rotary shaft and method for reducing non-uniform heating thereof are provided. The rotary shaft may include a tubular body having a longitudinal axis extending therethrough. An outer surface of the tubular body may define a groove at least partially extending radially inward from the outer radial surface toward the longitudinal axis of the tubular body to define a depth thereof. The rotary shaft may include a thermal barrier at least partially disposed in the groove and configured to absorb at least a portion of heat generated from rotation thereof.

6 Claims, 2 Drawing Sheets

THERMAL BARRIER COATING FOR BEARING JOURNAL SURFACES OF ROTARY SHAFTS

CROSS-REFERENCE TO RELATED APPLICATIONS

This application claims priority to U.S. Provisional Patent Application Ser. No. 61/842,107, filed on Jul. 2, 2013. This priority application is hereby incorporated by reference in its entirety into the present application to the extent consistent with the present application.

BACKGROUND

Rotating machines, such as turbines, compressors, and compact motor-compressors, are often utilized in a variety of applications and industries to compress a gas. FIG. 1 illustrates a partial cross-sectional schematic view of a conventional rotating machine 100. The conventional rotating machine 100 may include a motor 102 coupled with a compressor 104, such as a centrifugal compressor, in a hermetically sealed housing 106. Through a rotary shaft 110 supported by one or more bearings 108, the motor 102 may drive or rotate the compressor 104 in order to generate a flow of a compressed process gas. As illustrated in FIG. 1, the bearings 108 may be utilized at various positions along the rotary shaft 110 of the rotating machine 100. For example, the bearings 108 may be positioned at or near one or more axial ends of the rotary shaft 110 and, depending on a length of the rotary shaft 110, at one or more positions between the axial ends of the rotary shaft 110. As the motor 102 drives the compressor 104, heat may be generated along the rotary shaft 110 at interfacing surfaces between the rotary shaft 110 and the bearings 108. At high rotational speeds, the temperature of the rotary shaft 110 at and/or about the interfacing surfaces may be higher than other portions of the rotary shaft 110, resulting in non-uniform heating along the length and/or around a circumference of the rotary shaft 110. The non-uniform heating may cause the rotary shaft 110 to bend at these interfacing surfaces, thereby causing synchronous instability and/or vibration of the rotary shaft 110. The synchronous instability and/or vibration of the rotary shaft 110 may decrease the efficiency of the rotating machine 100 and/or cause damage to one or more components thereof.

In view of the foregoing, rotating machines 100 often minimize synchronous vibrations by reducing the rotational speed of the rotary shaft 110. Reducing the rotation speed, however, limits the production capacity of the rotating machine 100. Further, reducing the rotational speed may not be a viable option where the motor 102 of the rotating machine 100 lacks a variable frequency drive.

What is needed, then, is a rotary shaft and method for reducing non-uniform heating thereof, capable of minimizing synchronous vibrations by reducing or diffusing heat localized at and/or about the interfacing surfaces between the rotary shaft and bearings of a rotating machine.

SUMMARY

Embodiments of the disclosure may provide a rotary shaft including a tubular body having a longitudinal axis extending therethrough. An outer surface of the tubular body may define a groove at least partially extending radially inward from the outer radial surface toward the longitudinal axis of the tubular body to define a depth thereof. The rotary shaft may include a thermal barrier at least partially disposed in the groove and configured to absorb at least a portion of heat generated from rotation thereof.

Embodiments of the disclosure may further provide a bearing system having a rotary shaft. The rotary shaft may include a tubular body having a longitudinal axis extending therethrough. An outer surface of the tubular body may define a groove at least partially extending radially inward from the outer radial surface toward the longitudinal axis of the tubular body to define a depth thereof. The rotary shaft may also include a thermal barrier at least partially disposed in the groove and configured to absorb at least a portion of heat generated from rotation thereof. The bearing system may also include a bearing configured to support the rotary shaft. The bearing may include a bearing journal disposed radially outward of the thermal barrier of the rotary shaft. An inner radial surface of the bearing journal and an outer surface of the thermal barrier may define an annular gap configured to permit relative rotation of the rotary shaft.

Embodiments of the disclosure may further provide a method for reducing non-uniform heating of a rotary shaft. The method may include supporting the rotary shaft with a bearing system. The rotary shaft may include a tubular body having a longitudinal axis extending therethrough. An outer radial surface of the rotary shaft may define a groove at least partially extending radially inward from the outer radial surface toward the longitudinal axis of the tubular body to define a depth thereof. The rotary shaft may also include a thermal barrier at least partially disposed in the groove and configured to engage a bearing journal of the bearing system. The method may also include rotating the rotary shaft within the bearing system and generating heat between the thermal barrier and the bearing journal. The method may further include absorbing a portion of the heat generated from the rotation of the rotary shaft with the thermal barrier such that the non-uniform heating of the rotary shaft may be reduced.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
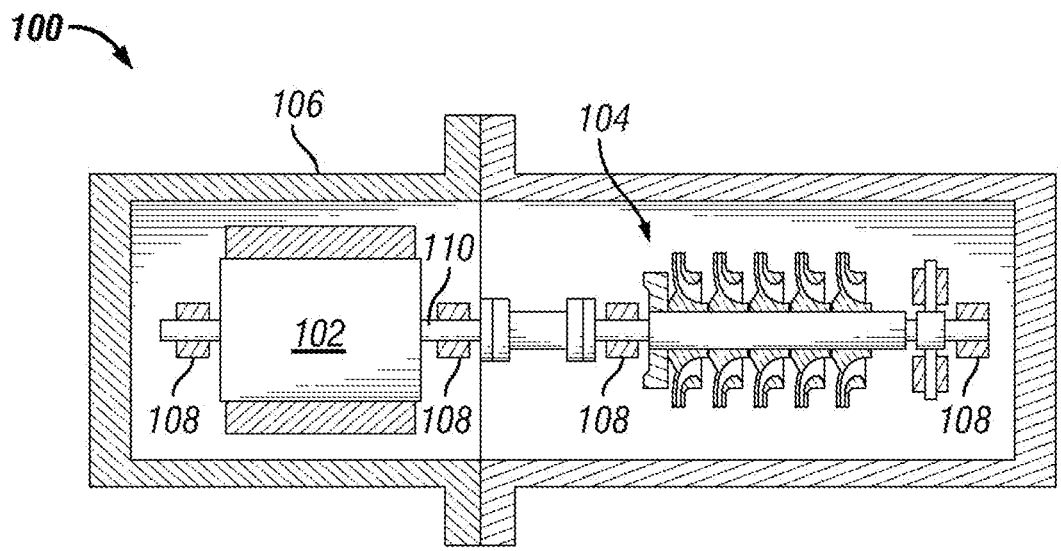
FIG. 1 illustrates a partial cross-sectional schematic view of a conventional rotary machine.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
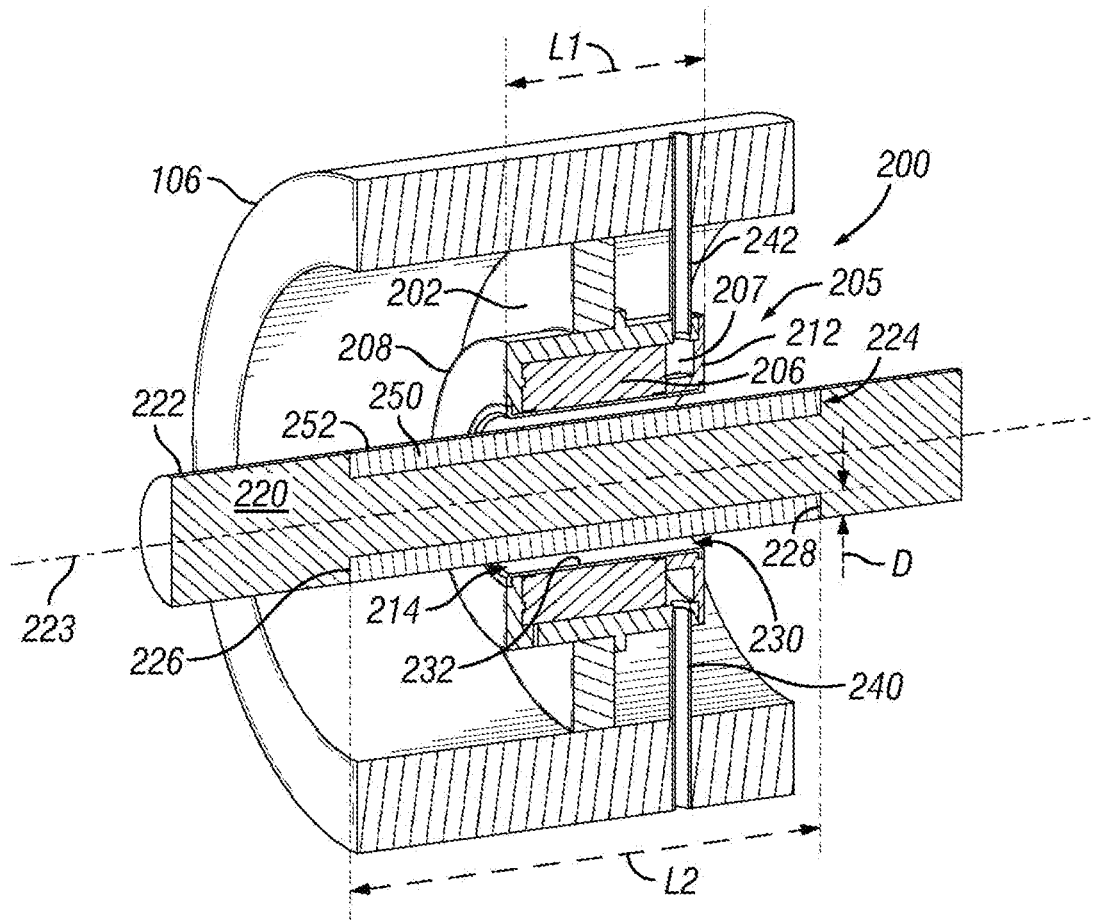
FIG. 2 illustrates a cross-sectional perspective view of an exemplary rotary shaft supported by a bearing system, according to one or more embodiments disclosed.

FIG. 2 illustrates a cross-sectional perspective view of an exemplary rotary shaft 220 supported by a bearing system 200, according to one or more embodiments. The bearing system 200 may include one or more bearings (one is shown 205) configured to support the rotary shaft 220. While only one bearing 205 is illustrated in FIG. 2, it may be appreciated that each of the bearings in the bearing system 200 may include similar components and parts. Accordingly, discussions herein regarding the bearing 205 will be referred to in the plurality (i.e., bearings 205). The bearings 205 may support the rotary shaft 220 at one or more axially-spaced positions along the rotary shaft 220, including, but not limited to, opposing axial ends of the rotary shaft 220. The bearings 205 may also support the rotary shaft 220 at one or more axially-spaced positions between the axial ends of the rotary shaft 220. The bearing system 200 may be enclosed in the housing 106 of the rotating machine 100 illustrated in FIG. 1. Illustrative rotating machines 100 may include, but are not limited to turbines, motors, generators, compact motor-compressors, compressors, such as rotary compressors, a turboset, or any other rotating equipment assembly including one or more bearings supporting a rotary shaft. The bearings 205 of the bearing system 200 may be supported by a mounting bracket 202 that may couple the bearings 205 with an inner surface of the housing 106 of the rotating machine 100.

The bearings 205 of the bearing system 200 may include an enclosure 208 coupled with the mounting bracket 202 and adapted to support the bearings 205 within the rotating machine 100. The enclosure 208 may be or form a generally hollow, annular structure having a radial outer surface coupled with the mounting bracket 202. An annular axial plate 212 may be coupled with one or more axial ends of the enclosure 208. The annular axial plate 212 and/or the enclosure 208 may define a bore 214 through which the rotary shaft 220 may extend. The annular axial plate 212 and/or the axial ends of the enclosure 208 may also define an axial length (L1) of the bearings 205 and/or components thereof that may engage or interface with the rotary shaft 220 and/or components thereof.

As illustrated in FIG. 2, the rotary shaft 220 may be or include a generally tubular body having an outer radial surface 222 defining a circumference thereof. The outer radial surface 222 of the rotary shaft 220 may define a groove 224 that may span or extend axially along a portion of the rotary shaft 220. The groove 224 may have a first axial end 226 and a second axial end 228 defining an axial length (L2) thereof. The axial length (L2) of the groove 224 may be greater than the axial length (L1) of the bearings 205 and/or components thereof. For example, as illustrated in FIG. 2, the first and second axial ends 226, 228 of the groove 224 may extend beyond the axial ends of the enclosure 208 of the bearings 205 and/or the annular axial plate 212 coupled thereto. In at least one embodiment, illustrated in FIG. 2, the groove 224 may extend or span about the entire circumference of the rotary shaft 220. In another embodiment, the outer radial surface 222 may define a plurality of grooves 224 that may be circumferentially-offset from one another about the circumference of the rotary shaft 220.

As illustrated in FIG. 2, the groove 224 may extend radially inward from the outer radial surface 222 of the rotary shaft 220 towards a longitudinal axis 223 thereof to define a depth (D) of the groove 224. In at least one embodiment, the depth (D) of the groove 224 may be uniform or constant along the axial length (L2) thereof. For example, the depth (D) of the groove 224 at the first axial end 226 thereof may be the same or substantially the same as the depth (D) at the second axial end 228. In another embodiment, the depth (D) of the groove 224 may vary along the axial length (L2) thereof. For example, the depth (D) of the groove 224 at the first axial end 226 may be greater or less than the depth (D) at the second axial end 228. In another example, the depth (D) of the groove 224 may vary as a function of the distance from the first and/or the second axial ends 226, 228 of the groove 224. As further described herein, a thermal barrier 250 may be disposed in the groove 224 of the rotary shaft 220.

The bearing system 200 may include a bearing journal 206 coupled with and/or contained in the enclosure 208. The bearing journal 206 may be disposed radially outward of the rotary shaft 220 and/or components thereof. For example, the bearing journal 206 may be disposed radially outward of the thermal barrier 250 disposed in the groove 224 of the rotary shaft 220. A radial clearance or annular gap 230 may be defined between an inner radial surface 232 of the bearing journal 206 and the thermal barrier 250 of the rotary shaft 220. The annular gap 230 may permit relative motion of the rotary shaft 220 in the enclosure 208 and/or the bearing journal 206. The inner radial surface 232 of the bearing journal 206 and the thermal barrier 250 may provide radial interfacing surfaces between the bearings 205 of the bearing system 200 and the thermal barrier 250 of the rotary shaft 220.

During one or more modes of operating the rotating machine 100, a lubricant may be contained in the annular gap 230. The lubricant contained in the annular gap 230 may form a thin film on or about the radial interfacing surface between the bearings 205 of the bearing system 200 and the thermal barrier 250 of the rotary shaft 220. In at least one embodiment, an isolation cavity 207 defined by the enclosure 208 and the annular axial plate 212 may be filled with the lubricant. Illustrative lubricants may include, but are not limited to, hydrocarbons, silicone-based transformer fluids, or any other fluid known in the art capable of providing the required stability, heat transfer, inflammability, and/or chemical compatibility with the bearing system 200 and/or components thereof.

In at least one embodiment, transfer tubes 240, 242 may extend from the enclosure 208 of the bearing system 200 to the housing 106 of the rotating machine 100. The transfer tubes 240, 242 may provide sealed passages that project radially outward from the enclosure 208 to an outer surface of the housing 106. The transfer tubes 240, 242 may be located or positioned at or adjacent the axial ends of the enclosure 208 or at any location therebetween. In at least one embodiment, one of the transfer tubes, such as transfer tube 240, may be positioned at a lower portion of the rotating machine 100 and may provide a fluid passageway to facilitate bleeding or draining of the lubricant from the isolation cavity 207 of the enclosure 208. In another embodiment, one of the transfer tubes, such as transfer tube 242 may be positioned at an upper portion of the rotating machine 100 and may provide a fluid passageway to facilitate filling of the isolation cavity 207 of the enclosure 208 with the lubricant. Although, only two transfer tubes 240, 242 are illustrated, it may be appreciated that any number of transfer tubes 240, 242 may be included in the bearing system 200.

As discussed above, the thermal barrier 250 may be disposed in the groove 224 of the rotary shaft 220. The thermal barrier 250 may include or be composed of one or more thermal barrier materials. The thermal barrier materials may be provided as layers, alloys, mixtures, composites, or any combination thereof. The thermal barrier materials may have the same or different thermal conductivities and/or coefficients of thermal expansion with one another. For example, the thermal barrier 250 may include a first layer of a first thermal barrier material and a second layer of a second thermal barrier material, and the first thermal barrier material may have the same thermal conductivity and/or coefficient of thermal expansion as the second thermal barrier material. Similarly, the thermal conductivity and/or coefficient of thermal expansion of the first thermal barrier material may be different from the second thermal barrier material. The thermal barrier materials may also have coefficients of thermal expansion that are the same or different than that of the rotary shaft 220. In at least one embodiment, the first thermal barrier material may be configured to dissipate or diffuse heat localized at and/or about the radial interfacing surfaces, and the second thermal barrier material may be configured to insulate the rotary shaft 220 from heat generated at and/or about the radial interfacing surfaces.

In at least one embodiment, the thermal barrier materials utilized for the thermal barrier 250 may reduce and/or diffuse heat localized at and/or about the radial interfacing surfaces between the bearing journal 206 of the bearing system 200 and the rotary shaft 220. Reducing and/or diffusing the heat at or about the radial interfacing surfaces may prevent or minimize uneven heating of the rotary shaft 220, thereby minimizing synchronous vibrations along the rotary shaft 220. The thermal barrier materials utilized for the thermal barrier 250 may be determined, at least in part, by the materials used in fabricating the rotary shaft 220, the bearing system 200, and/or components thereof. For example, the thermal barrier materials utilized may be selected to minimize the generation of heat between the thermal barrier 250 and the bearing journal 206. The thermal barrier material utilized may also be selected to maximize the dissipation or diffusion of heat generated between the thermal barrier 250 and the bearing journal 206. In another example, the thermal barrier material utilized may be determined, at least in part, by the coefficient of thermal expansion of the rotary shaft 220. The thermal barrier materials utilized for the thermal barrier 250 may be also determined, at least in part, by the axial length (L2) of the groove 224, the depth (D) of the groove 224, the circumferential length in which the groove 224 extends about the rotary shaft 220, or any combination thereof.

The thermal barrier materials may include, but are not limited to, those capable of absorbing and/or transferring or dissipating heat generated at and/or about the radial interfacing surfaces between the rotary shaft 220 and bearing system 200. For example, the thermal barrier materials may include, but are not limited to, ceramics, such as metal oxides. Illustrative metal oxides may include, but are not limited to zirconium oxide, yttrium oxide, magnesium oxide, or any other metal oxides known in the art. The thermal barrier materials may also include, but are not limited to, anti-friction materials, such as graphite and/or alloys thereof. As will be appreciated, however, any similar anti-friction materials and/or materials capable of absorbing and/or transferring heat may be used without departing from the scope of the disclosure.

The rotary shaft 220 may be fabricated by machining an undercut in the outer radial surface 222 thereof to provide the groove 224. The thermal barrier 250 may then be applied or disposed in the groove 224 by varying methods or techniques. Illustrative methods or techniques may include, but are not limited to, thermal spraying, sputtering, electron beam physical vapor deposition, or any other method known in the art. In at least one embodiment, a circumference of the thermal barrier 250, defined by an outer surface 252 thereof, may be greater than the circumference of the rotary shaft 220. For example, the thermal barrier 250 may be applied such that the thermal barrier 250 may have a thickness greater than the depth (D) of the groove 224. The thermal barrier 250 disposed in the rotary shaft 220 may be machined to reduce the circumference thereof. For example, as illustrated in FIG. 2, the thermal barrier 250 may be machined such that the outer surface 252 thereof may be aligned with the outer radial surface 222 of the rotary shaft 220. The thermal barrier 250 may also be applied and/or machined such that the thickness thereof is less than the depth (D) of the groove 224, thereby providing the thermal barrier 250 having a circumference less than the circumference of the rotary shaft 220.

In an exemplary operation of the rotating machine 100, the rotary shaft 220 may be positioned such that the thermal barrier 250 may engage or interface with the bearing system 200 and/or components thereof. For example, as illustrated in FIG. 2, the rotary shaft 220 may be axially positioned such that the outer surface 252 of the thermal barrier 250 interfaces with the inner radial surface 232 of the bearing journal 206. The rotary shaft 220 may rotate in place while being supported by the bearing journal 206 of the bearing system 200. For example, the rotary shaft 220, including the thermal barrier 250 disposed in the groove 224 thereof, may rotate relative to the bearing journal 206, the enclosure 208, and the mounting bracket 202 of the bearing system 200, and the housing 106 of the rotating machine 100, all of which are generally stationary. The rotation of the rotary shaft 220 relative to the bearing journal 206 may result in the generation of heat (e.g., frictional heat) at and/or about the radial interfacing surfaces. The generation of heat at and/or about the radial interfacing surfaces between the rotary shaft 220 and the bearing journal 206 may result in non-uniform heating along the rotary shaft 220. For example, at least a portion of the heat generated between the bearing journal 206 and the rotary shaft 220 may not dissipate, thereby resulting in the localization of heat at and/or about the radial interfacing surface. The localization of heat at and/or about the radial interfacing surface may result in bending of the rotary shaft 220. In at least one embodiment, the thermal barrier 250 may absorb and/or dissipate at least a portion of the heat to reduce the localized heating and the temperature at and/or about the radial interfacing surfaces. For example, the thermal barrier 250 may absorb at least a portion of the heat at and/or about the radial interfacing surfaces and dissipate or transfer the heat to another portion of the rotary shaft 220. In at least one embodiment, the thermal barrier 250 may transfer the absorbed heat to portions of the rotary shaft 220 having a temperature lower than the temperature at and/or about the radial interfacing surfaces. Transferring the absorbed heat at and/or about the radial interfacing surfaces to portions of the rotary shaft 220 having a temperature lower than the temperature at and/or about the radial interfacing surfaces may reduce non-uniform heating along and/or around the circumference of the rotary shaft 220. Accordingly, the absorption and transfer of the heat at and/or about the radial interfacing surfaces may reduce the bending of the rotary shaft 220 and thereby reduce synchronous instability and/or vibrations thereof.

Figure 3:
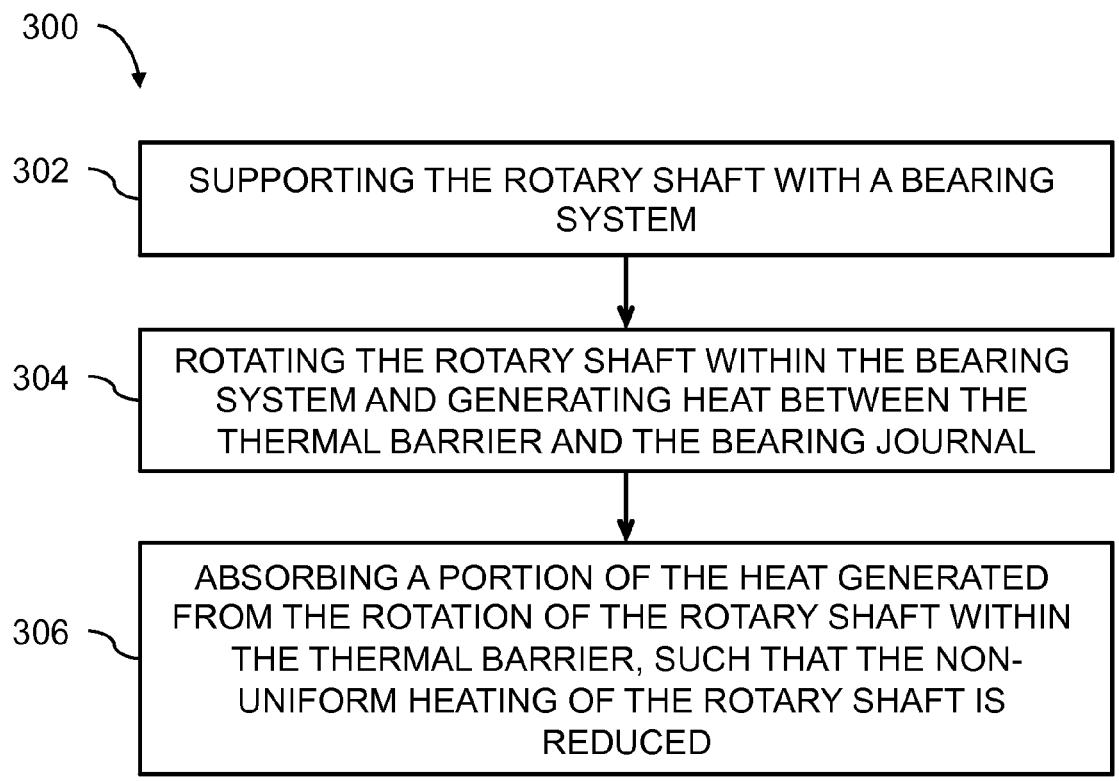
FIG. 3 is a flowchart illustrating a method for reducing non-uniform heating of a rotary shaft, according to one or more embodiments disclosed.

FIG. 3 is a flowchart illustrating a method 300 for reducing non-uniform heating of a rotary shaft. The method 300 may include supporting the rotary shaft with a bearing system, as shown at 302. The rotary shaft may include a tubular body having a longitudinal axis extending therethrough and an outer radial surface defining a groove. The groove may at least partially extend radially inward from the outer radial surface toward the longitudinal axis of the tubular body to define a depth thereof. The rotary shaft may also include a thermal barrier at least partially disposed in the groove. The thermal barrier may be configured to engage a bearing journal of the bearing system. The method 300 may also include rotating the rotary shaft within the bearing system and generating heat between the thermal barrier and the bearing journal, as shown at 304. The method 300 may further include absorbing a portion of the heat generated from the rotation of the rotary shaft with the thermal barrier, such that the non-uniform heating of the rotary shaft is reduced, as shown at 306.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. A bearing system disposed in a hermetically sealed housing, comprising:
   a rotary shaft comprising:
      a cylindrical body having a longitudinal axis extending therethrough and an outer radial surface defining a groove at least partially extending radially inward from the outer radial surface toward the longitudinal axis of the cylindrical body to define a depth thereof; and
      a thermal barrier disposed in the groove and configured to absorb at least a portion of heat generated from rotation of the rotary shaft; and
   a bearing configured to support the rotary shaft, the bearing comprising:
      a bearing journal disposed radially outward of the thermal barrier of the rotary shaft, an inner radial surface of the bearing journal and an outer surface of the thermal barrier defining an annular gap, the annular gap configured to permit relative rotation of the rotary shaft; and
      a first fluid passageway and a second fluid passageway, each defined at least in part by the bearing and extending radially from an enclosure containing the bearing journal to an outer surface of the hermetically sealed housing, the first fluid passageway configured to transport lubricant to the enclosure and the second fluid passageway configured to drain the lubricant from the enclosure,
   wherein the groove extends axially along at least a portion of the cylindrical body to define an axial length thereof, the groove continuously spans a circumference of the cylindrical body along the axial length of the groove, and the axial length of the groove is greater than an axial length of the enclosure.

2. The bearing system of claim 1, wherein the outer surface of the thermal barrier is radially aligned with the outer radial surface of the cylindrical body.

3. The bearing system of claim 1, wherein the thermal barrier comprises a metal oxide.

4. The bearing system of claim 1, further comprising the lubricant disposed in the annular gap between the bearing journal and the thermal barrier.

5. The bearing system of claim 1, wherein the depth of the groove is constant along the axial length of the groove.

6. The bearing system of claim 1, wherein the depth of the groove varies along the axial length of the groove.

* * * * *